US012268225B2

(12) United States Patent
De Paepe et al.

(10) Patent No.: US 12,268,225 B2
(45) Date of Patent: Apr. 8, 2025

(54) EMULSION AND PROCESS FOR MAKING SAME

(71) Applicant: Cargill, Incorporated, Wayzata, MN (US)

(72) Inventors: Jeroen De Paepe, Zottegem (BE); Fabien Declercq, Le Grand Madieu (FR)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 18/536,672

(22) Filed: Dec. 12, 2023

(65) Prior Publication Data

US 2024/0108025 A1 Apr. 4, 2024

Related U.S. Application Data

(62) Division of application No. 15/539,029, filed as application No. PCT/US2015/067278 on Dec. 22, 2015, now Pat. No. 11,896,029.

(30) Foreign Application Priority Data

Dec. 23, 2014 (EP) .................... 14200146

(51) Int. Cl.
| A23G 9/52 | (2006.01) |
| A23D 7/01 | (2006.01) |
| A23D 7/02 | (2006.01) |
| A23G 1/00 | (2006.01) |
| A23G 1/36 | (2006.01) |
| A23G 1/56 | (2006.01) |
| A23G 9/32 | (2006.01) |
| A23L 35/00 | (2016.01) |

(52) U.S. Cl.
CPC ............... *A23G 9/52* (2013.01); *A23D 7/011* (2013.01); *A23D 7/02* (2013.01); *A23G 1/0009* (2013.01); *A23G 1/36* (2013.01); *A23G 1/56* (2013.01); *A23G 9/327* (2013.01); *A23L 35/10* (2016.08); *A23G 2200/08* (2013.01)

(58) Field of Classification Search
None
See application file for complete search history.

(56) References Cited

U.S. PATENT DOCUMENTS

| 3,876,794 A * | 4/1975 | Rennhard ............... A23L 35/10 426/660 |
| 4,313,966 A | 2/1982 | Basa |
| 5,240,734 A | 8/1993 | Izzo |
| 5,468,509 A | 11/1995 | Schlup |
| 5,556,659 A | 9/1996 | De Pedro |
| 6,165,540 A | 12/2000 | Traitler |
| 6,174,555 B1 | 1/2001 | Leas |
| 2003/0175385 A1 | 9/2003 | Helferich |
| 2006/0121164 A1 | 6/2006 | Hanselmann |
| 2007/0048431 A1 | 3/2007 | Budwig |
| 2008/0241335 A1 | 10/2008 | Rey |
| 2009/0162485 A1 | 6/2009 | Schmitt |
| 2009/0291170 A1 | 11/2009 | Rousset |
| 2009/0291770 A1 | 11/2009 | You |
| 2012/0100276 A1 | 4/2012 | Esteve |
| 2013/0183428 A1 | 7/2013 | Declercq |
| 2013/0273230 A1 * | 10/2013 | de Man ............... A23D 7/001 426/603 |

FOREIGN PATENT DOCUMENTS

| CN | 1179896 A | 4/1998 |
| EP | 0397247 B1 | 7/1995 |
| EP | 0657105 B1 | 1/2000 |
| EP | 1040760 B1 | 5/2003 |
| EP | 0958747 B1 | 11/2004 |
| EP | 1875810 B1 | 10/2011 |
| EP | 1759591 B2 | 7/2014 |
| EP | 3367811 B1 | 7/2019 |
| WO | 0195737 W | 12/2001 |
| WO | 2010149323 A2 | 12/2010 |
| WO | 2012041523 A1 | 4/2012 |
| WO | 2015132206 A1 | 9/2015 |
| WO | 2016106282 A1 | 6/2016 |
| WO | 2017075008 A1 | 5/2017 |
| WO | 2017075010 A1 | 5/2017 |

OTHER PUBLICATIONS

"European Application Serial No. 16794128.5, Communication pursuant to Article 94(3) EPC mailed Feb. 26, 2020", 7 pgs.
"European Application Serial No. 16794128.5, Communication pursuant to Article 94(3) EPC mailed Apr. 1, 2019", 8 pgs.
"European Application Serial No. 16794128.5, Response to Communication pursuant to Article 94(3) EPC filed Apr. 29, 2020", 9 pgs.
"European Application Serial No. 16794128.5, Response to Communication pursuant to Article 94(3) EPC filed Jul. 25, 2019", 9 pgs.
"European Application Serial No. 16794128.5, Response to Communication pursuant to rules 161(1) and 162 EPC filed Dec. 14, 2018", 4 pgs.
"European Application Serial No. 16794129.3, Decision to Grant mailed Jul. 4, 2019", 2 pgs.
"European Application Serial No. 16794129.3, Response to Communication Pursuant to Rules 161(1) and 162 EPC filed Dec. 14, 2018", 4 pgs.
"International Application Serial No. PCT/US2016/058795, International Preliminary Report on Patentability mailed May 1, 2018", 8 pgs.

(Continued)

*Primary Examiner* — Jyoti Chawla

(57) ABSTRACT

The present invention relates to a stable emulsion of an aqueous phase in a lipid phase wherein non-fatty cocoa solids and/or non-fatty milk solids are present in the lipid phase. The present invention further relates to a process for making an emulsion, said process comprising adding the lipid phase in two steps.

18 Claims, No Drawings

(56) References Cited

OTHER PUBLICATIONS

"International Application Serial No. PCT/US2016/058799, International Preliminary Report on Patentability mailed May 1, 2018", 7 pgs.
Food Stabilisers, Thickeners, and Gelling Agents, Food Stabilisers, Thickeners and Gelling Agents Edited by Alan Imeson, 2009.
Frank, Carrageenan Deep Dive—Kappa, Iota and Lambda, Prospector, Apr. 2015, https://knowledge.ulprosperctor.com/2329/fbn-carrageenan-deep-dive-kappa-iota-lambda/.
International Search Report mailed Jan. 18, 2017 of PCT/US2016/058799 (4 pages).
International Search Report mailed Jan. 25, 2017 for PCT/US2016/058795 (5 pages).
International Search Report mailed Mar. 15, 2016 for International Application No. PCT/US2015/067278 (3 pages).
Minifie Chocolate, Cocoa, and Confectionery 3rd Edition Chapman and Hall 1989 pp. 91, 135 and 136.
Norton J E et al, "Development and characterization of tempered cocoa butter emulsions containing up to 60% water", Journal of Food Engineering, Barking, Essex, GB, vol. 95, n°.1, pp. 172-178. Jan. 11, 2009.
Roos et al., "Melting and glass transitions of low molecular weight carbohydrates", Carbohydrate Research, Pergamon, GB, vol. 238, Jan. 15, 1993 (Jan. 15, 1993), pp. 39-48, XP026634925, ISSN: 0008-6215, DOI: 10.1016/0008-6215(93)87004-C.
Sergent et al, Texture optimization of water-in-oil emulsions, 2004;9(2): 125-34, doi: 10.1081/pdt-120027424 (abstract).
Sergent et al. "Texture Optimization of Water-in-Oil Emulsions," Pharmaceutical Development and Technology, vol. 9, No. 2, 2004, 125-134.
Siegfried, Walter Souci, et al., "Food composition and nutrition tables; coconut oil (refined)", In: "Food composition and nutrition tables = Die Zusammensetzung der Lebensmittel Nahrwert-Tabellen = La composition des aliments. Tableaux des valeurs nutritives," 2008, Medpharm Scientific Publ. [u.a.], Stuttgart [u.a.], XP055336211, pp. 199-200.
Stephen T. Beckett: "Vitamins and minerals", In: "Industrial Chocolate Manufacture and Use", Jan. 1, 2009 (Jan. 1, 2009), Blackwell Publishing Ltd., XP055669941, p. 625.
USDA "Basic Report 19120, Candies, milk chocolate" and "Full Report 45260155, Dark Chocolate" https://ndbnal.usda.gov/ndb/search/list, pp. 1-2 printed May 9, 2019 (Year: 2019).

\* cited by examiner

EMULSION AND PROCESS FOR MAKING SAME

CROSS-REFERENCE TO RELATED APPLICATIONS

This application is a Divisional application of U.S. application Ser. No. 15/539,029, filed Jun. 22, 2017, which is a national phase application of PCT/US2015/067278, filed Dec. 22, 2015, which claims the benefit of European Patent Application No. 14200146.0, filed Dec. 23, 2014, each of which is hereby incorporated by reference herein in its entirety.

FIELD OF THE INVENTION

The present invention relates to a stable emulsion of an aqueous phase in a lipid phase wherein non-fatty cocoa solids and/or non-fatty milk solids are present in the lipid phase. The present invention further relates to a process for making an emulsion, said process comprising adding the lipid phase in at least two steps.

BACKGROUND

Chocolate products contain significant amounts of both sugar and fat and are therefore rich in calories. In particular, chocolate products are used in chilled and frozen confectionery and desserts as coating layers or inclusion. It is an ongoing objective in the chocolate industry to provide chocolate products with reduced fat content and/or reduced calories. One approach has been to add water to chocolate products by forming emulsions with cocoa butter. Unfortunately, the preparation of such water-containing chocolates products is a difficult task: technologies that are currently available tend to have a negative impact on taste, texture, processability, stability and/or shelf-life. Even when only small amounts of water are added, this causes perceivable rheological changes in the product, usually accompanied by lumping and/or granulation and a coarse unacceptable mouth-feel. The addition of larger quantities of water, usually in the form of fresh cream or full cream milk, results in the production of "ganache" which is conventionally used as a short shelf-life filling for truffles or as a topping for confections and which is not suitable for use as coating material. Ganache is the confectioner's term for a phase-inverted (i.e. oil-in-water) chocolate preparation and has a softer eating texture than normal chocolate and does not have the sought-after snap of traditional chocolate when broken.

U.S. Pat. No. 5,468,509 describes a milk chocolate containing 1-16% water in which the chocolate preparation is produced by mixing cocoa butter with cocoa ingredients in the presence of an edible emulsifier, so that the ingredients are thoroughly coated with cocoa butter. The mixture is then blended with an aqueous phase prepared separately by mixing water, sweetener and milk solids to give a uniform mixture without resulting in high viscosity. The mixing is kept to a minimum speed to avoid exposing the cocoa solids in the cocoa butter to the water, whilst still producing a uniform mixture. If the cocoa solids in the cocoa butter were exposed to water, undesirable high viscosities such as gum formation and lumps of the mixed products as well as separation of the mixed products would result. Unfortunately, this slow mixing also results in an unstable product, with large water droplets, susceptible to phase separation, an undesirable mouth-feel and a much reduced shelf-life.

WO01/95737 discloses a process to overcome the fragility of the water-in-oil emulsion. Herein, a water-in-oil emulsion is prepared using equal parts of water and cocoa butter. Dark chocolate prepared by conventional methods including a conching step is melted and added thereto. This results in a dark chocolate containing 10% water. A fat suspension of milk powder is subsequently added thereto, leading to a milk chocolate containing 8% water and 23% fat, in a first embodiment. In a second embodiment, the milk chocolate contains 17% water and 30% fat. The resulting suspension turns out mouldable and demouldable so as to obtain a chocolate bar. However, no other sugar is added than the sugar present in the dark chocolate. This implies that the sugar content is reduced in the order of 30 to 50%. The cocoa content is however not substantially changed. It appears therefore that the standard cocoa-sugar ratio is not used, which likely changes the taste of the resulting chocolate.

U.S. Pat. No. 6,174,555 discloses water-containing soft coating chocolate products for use in ice-cream confectionery. To maintain a good texture even at the extreme temperatures of a frozen product, water-in-oil emulsions are produced with vegetable oils and then added to a melted chocolate product. Thus, the resulting product will in fact have a higher fat content, a poor "snap" at room temperature and, because of the vegetable oil content, cannot be labeled as chocolate.

A further process is known from J. E. Norton et al., *Journal of Food Engineering*, 95 (2009), 172-178. This further process comprises the preparation of a lipid composition comprising cocoa butter and an emulsifier at a temperature above the final melting point of the cocoa butter crystals. This temperature is approximately 60° C. A 20 wt % aqueous sugar solution was heated to 60° C. and thereafter added to the cocoa butter. The whole mixture was emulsified for 3 min using a high shear mixer, fitted with a fine emulsifier screen. This pre-emulsion was then pumped through a margarine line. Such margarine line comprises a first unit that comprises a stirrer with two blades and a second unit with a stirrer comprising pins. The first unit temperature was 30° C. and the second unit temperature was 40° C. These temperatures were selected to start fat crystallization in the first unit and to control the polymorphic form of the cocoa butter in the second unit. The mixtures were fully emulsified, with no free water. Droplets were formed with a diameter of approximately 1 micron. When the exit temperature of the second unit was in the range of 29 to 32° C., a tempered emulsion was obtained. In other words, the crystallization occurred in the lower melting polymorphic forms of cocoa butter that are desired for a good chocolate quality.

However, Norton et al. discloses cocoa butter emulsions, with up to 20% sugar content of the aqueous solution. It does not disclose chocolate. Nearly all experiments are carried out with a 1% sugar solution, an aqueous phase of 21% and a fat content of 78%. He mentions emulsions with 50% water, but no conclusions are given thereon. Moreover, the tables 3a and 3b show that with an increase in water content the amount of water present in droplets over 100 microns size increases. For a 50% water sample, the percentage of water in droplets over 100 micron size is 34% and 73% for two different emulsifiers. As shown in table 7, the average droplet size furthermore increases with an increase water and sugar content. In other words, it appears that Norton's disclosure provides a nice basis, but does not address chocolate manufacturing with a higher sugar content. And with an increase in water and sugar content, the results are less convincing. Moreover, there is no indication that the resulting taste of the chocolate is good.

US2006/0121164 discloses chocolate products based on oil-in-water suspensions. These will inherently suffer from a number of drawbacks including reduced stability (compared to products based on water-in-oil suspensions), a dependency on structuring agents (to structure and sufficiently solidify the aqueous phase) and an undesirable texture and mouth-feel. In particular, it would be very difficult, if not impossible, to use the claimed technology to make chocolate products with a desirable "snap".

There is therefore still a need in the market for improved emulsion-based chocolate products with a reduced fat content and/or reduced calories. In particular there is a need to provide stable chocolate emulsion products which also have a snappy texture at colder temperatures, in particular at freezing temperatures. The present invention addresses this need.

STATEMENTS OF THE INVENTION

The present invention relates to an emulsion of an aqueous phase in a lipid phase characterized in that:
a. The aqueous phase is dispersed throughout the lipid phase in the form of droplets, the lipid in the lipid phase being crystalline; and in that
b. The emulsion comprises an emulsifier; and in that
c. Non-fatty cocoa solids and/or non-fatty milk solids are present in the lipid phase, and in that
d. The emulsion has a temperature of 8° C. or lower, preferably of 0° C. or lower.

The invention further relates to a food product comprising the emulsion of the present invention and further food ingredients.

The invention further relates to a process to produce an emulsion of an aqueous phase in a lipid phase, comprising the steps of:
a. Providing a lipid phase and an aqueous phase, and
b. Emulsifying the aqueous phase with part of the lipid phase to obtain a pre-emulsion of the aqueous phase in said part of the lipid phase, and
c. Optionally cooling the pre-emulsion obtained in step b, and
d. Adding part of the lipid phase under medium to low shear characterized in that the part of the lipid phase in step d. comprises non-fatty cocoa solids and/or non-fatty milk solids.

DETAILED DESCRIPTION

The present invention relates to an emulsion of an aqueous phase in a lipid phase characterized in that:
a. The aqueous phase is dispersed throughout the lipid phase in the form of droplets, the lipid in the lipid phase being crystalline; and in that
b. The emulsion comprises an emulsifier, and in that
c. Non-fatty cocoa solids and/or non-fatty milk solids are present in the lipid phase, and in that
d. The emulsion has a temperature of 8° C. or lower, preferably of 0° C. or lower.

Emulsion

The emulsion for the purpose of the present invention is an emulsion of a water phase in a lipid phase, also commonly referred to as a water-in-oil emulsion. The aqueous phase is the dispersed phase of the emulsion and the lipid phase is the continuous phase of the emulsion. The emulsion of the present invention is preferably a chocolate emulsion, i.e. it comprises typical ingredients of chocolate such as a lipid as typically used in chocolate, non-fatty cocoa solids and/or non-fatty milk solids.

The emulsion is characterized in that it has a temperature of 8° C. or lower, more preferably, it has a temperature of 6° C. to −40° C., more preferably of 5° C. to −20° C., even more preferably of 0° C. to −18° C., yet even more preferably of −4° C. to −18° C., yet even more preferably of −10° C. to −18° C. and most preferably of −10° C. to −15° C. It has been found that when the emulsion is kept at above mentioned temperatures, the problem of water migration out of the emulsion is substantially avoided. Without wishing to be bound by any theory, it is believed that water migration is responsible for sugar crystallisation which in turn causes the texture of the emulsion to be less smooth, more crumbly, and more granular. Thus the emulsion of the present invention does not present impairment of texture but remains stable over time during storage at above mentioned temperatures.

The emulsion is further characterized in that it has a hard texture (snappy texture) at above mentioned temperatures. The hardness of the emulsion of the present invention, measured according to method 1 described below, is of 400 g or higher, preferably of 500 g or higher, more preferably of 1000 g or higher, more preferably of 1200 g to 5000 g, even more preferably of 1500 g to 4000 g, yet even more preferably of 1500 g to 3000 g, yet even more preferably of 2000 g to 3000 g, yet even more preferably of 2500 g to 3000 g.

The aqueous phase may amount to 5 to 70 wt %, preferably 10 to 65 wt %, more preferably 15 to 60 wt %, even more preferably 20 to 60 wt %, yet even more preferably 30 to 60 wt %, yet even more preferably from 40 to 60 wt % of the total weight of the emulsion of the present invention. The lipid phase thus may amount to 30 to 95 wt %, preferably 35 to 90%, preferably 40 to 85 wt %, more preferably from 40 to 80 wt %, even more preferably from 40 to 70 wt %, even more preferably from 40 to 60 wt %, based on the total weight of the emulsion of the present invention.

The emulsion of the present invention is a chocolate product either because it contains cocoa butter or cocoa butter alternatives or non-fatty cocoa solids. It should be understood that the term chocolate is used in this description to designate chocolate and its analogues. Thus all or part of the cocoa butter may be replaced by one or more cocoa butter alternatives which are fats of vegetable origin currently used in confectionery. Preferably, the chocolate emulsion of the present invention does not contain products such as gelling agents and/or structuring agents like for example carrageenans, pectins, gellan, gelatines, guar, acacia gum, sodium alginate, xanthan gum or globular proteins such as those contained in whey protein isolate, egg white protein isolate, soy protein isolate and the like. The emulsion of the present invention is particularly suitable for use as coating or filling in different types of food products, in particular chilled food products and more particularly frozen food products, preferably frozen confections.

Below the melting temperature of the lipid phase, the lipid in the lipid phase is in crystalline form and thereby, the water droplets are surrounded by crystalline lipid phase.

Aqueous Phase

The aqueous phase is formed from an aqueous composition. The aqueous composition will typically be a water-based composition. The aqueous phase can thus be plain water. Preferably water is present in the aqueous phase in an amount from 5 to 40 wt %, 10 to 35 wt %, 15 to 30 wt %, 20 to 25 wt % based on the weight of the emulsion.

Preferably however, the aqueous phase comprises a sweetener. The aqueous phase can be any water based composition comprising suitable sweetener, such as sweetened water, fruit juices, fruit syrups, sweetened milk and the like.

The sweetener may be, for example, a crystalline, powder or liquid sweetener. Advantageously, the sweetener will be selected from the group consisting of: sugars, amorphous sweeteners, polyols, high intensity sweeteners and mixtures thereof. Any sugar, such as a monosaccharide or a disaccharide, can be used. Examples include sucrose, fructose and/or glucose (either in dry form or in the form of a syrup). Examples of amorphous sweeteners include honey, maple syrup and/or molasses. Examples of suitable polyols include maltitol, sorbitol, erythritol, lactitol, xylitol and/or mannitol. Examples of high intensity sweeteners include aspartame, sucralose, stevia-based sweeteners (such as Truvia®) and the like. Of course, any combination of the above sweeteners may also be used. For example, in order to reduce the caloric value of the chocolate product, a mixture of a polyol and sugar may be used. Thus the aqueous phase may comprise, and preferably comprises, a sweetener as described above, fruit juice, fruit syrup and combinations thereof. Preferably even, when sweetener is present in the emulsion at least 70 wt %, preferably at least 80 wt %, more preferably at least 90 wt %, even more preferably at least 95 wt % and yet even more preferably at least 99 wt % of said sweetener is present in the aqueous phase of the emulsion, thus the lipid phase comprises less sweetener than the aqueous phase of the emulsion. More preferably even, all the sweetener of the emulsion is present in the aqueous phase of the emulsion and not in the lipid phase of the emulsion.

Sweeteners such as sucrose, fructose, glucose, honey, maple syrup, molasses, polyols and the like are preferably included in the aqueous phase in an amount of from 65 to 90 wt %, more preferably from 67 to 90 wt %, even more preferably from 70 to 85 wt %, yet even more preferably from 75 to 80 wt %, based on the total weight of the aqueous phase. Other sweeteners, such as high-intensity sweeteners, will preferably be used in an amount sufficient to give a sweetness corresponding to a content of from 65 to 90 wt % crystalline sugar. Suitable amounts of fruit juice, fruit syrup, may be present in the aqueous phase to give a satisfactory sweetness. In particular, fruit juice or syrup may be used in combination with water to form the aqueous composition or it may be used alone (i.e. without water).

Due to the various types of sweeteners, of fruit juices and fruit syrups, some that may be more concentrated than others, the amounts that will be added to the aqueous phase may vary. The exact sweetener content of the aqueous phase will be determined by a person skilled in the art depending on the desired sweetness of the emulsion.

When a sweetener is present, advantageously, by having the aqueous phase, and therefore the sweetener, surrounded by a crystalline lipid phase, the present invention has a number of advantages. For example, the cooling effect typically associated with polyols such as erythritol or xylitol can be limited or avoided by pre-dissolving them in the aqueous composition prior to incorporation in the chocolate product. Similarly, processing difficulties typically observed when trying to incorporate viscous sweeteners such as honey can be avoided as they too can be pre-dissolved in the aqueous composition. Another advantage is the possibility to incorporate a wide range of flavours in the emulsion; in particular the addition of fruit juice, allows producing emulsions with various organoleptic sensations.

The sweetener may be present in the aqueous phase in any form. For example, it may be dissolved, partially dissolved, dispersed or suspended in the aqueous phase. Preferably, it will be at least partially dissolved. The sweetener may be present in an amount of from 5 to 60 wt %, preferably from 6.5 to 58.5 wt %, more preferably from 10 to 45 wt % of the emulsion.

The aqueous phase may also comprise a milk product. The milk product may be a defatted, low fat or full fat milk product, preferably selected from the group consisting of: milk itself, dehydrated or partially dehydrated milk (e.g. evaporated or sweetened condensed milk), milk powder, cream, soy milk products and mixtures of two or more thereof. Advantageously, the milk product will be a skimmed milk product. Where milk itself is used, it may be used in combination with water to form the aqueous composition or it may be used alone (i.e. without water).

Other optional ingredients may also be included in the aqueous phase. These may include flavouring agents, gelling agents, nutraceuticals such antioxidants, vitamins, minerals, and so on.

The aqueous composition is present in the emulsion in the form of an aqueous phase dispersed throughout the lipid phase in the form of droplets. The droplets will preferably be small in size. Advantageously they will have an average diameter of no more than 30 μm, preferably of no more than 20 μm, more preferably of no more than 15 μm. According to certain embodiments, the droplets may have an average diameter as small as 0.1 μm, 0.5 μm or 1 μm. According to one possible embodiment, the droplets will have an average diameter of 2-15 μm, preferably of 5-15 μm. This small droplet size is preferably achieved by high shear mixing during emulsification process.

Lipid Phase

The lipid phase is formed from a lipid composition. The constituents of the lipid composition will be selected by a skilled person depending on the nature of the emulsion being produced. Advantageously, the lipid composition will comprise lipids selected from the group consisting of: cocoa butter, cocoa butter alternatives (such as cocoa butter equivalents, cocoa butter substitutes or cocoa butter replacers), anhydrous milk fat, and mixtures of two or more thereof. Cocoa butter alternatives may include, for instance, hydrogenated and non-hydrogenated vegetable fats such as palm or coconut oil, interesterified palm or coconut oil, or palm or coconut oil fractions. The lipid composition may also comprise modified cocoa butter (such as interesterified cocoa butter) and/or cocoa butter fractions. For instance, it may comprise fractionated cocoa butter stearins. For example, the lipid composition will comprise stearin fractions from interesterified cocoa butter, preferably from enzymatically interesterified cocoa butter. The lipid composition should comprise one or more fats capable of forming substantially crystalline lipid phase around the aqueous droplets of the aqueous phase. Preferably, the lipid composition will comprise cocoa butter, more preferably it will further comprise anhydrous milk fat and even more preferably, the lipid composition will consist of cocoa butter or it will consist of cocoa butter and anhydrous milk fat.

Non-fatty cocoa solids and/or non-fatty milk solids are present in the lipid phase. They may be present in an amount of from 5 to 40 wt %, preferably from 10 to 40 wt %, more preferably from 15 to 40 wt %, even more preferably from 20 to 35 wt %, yet even more preferably from 25 to 30 wt % based on the total weight of the lipid phase.

Cocoa beans are composed of a fatty component, cocoa butter, and non-fatty components, generally called non-fatty cocoa solids, e.g. present in cocoa powder. Cocoa powder is usually provided in the form of full fat (20 to 24 wt % of fat), low fat (10 to 12 wt % of fat) or defatted (0 to 1 wt % of fat) cocoa powder or in the form of cocoa liquor (typically about 54 wt % of fat).

Similarly, non-fatty milk solids are any milk solids other than milk fat. They may be provided in the form of full fat, low fat or defatted milk powder milk, concentrated milk or hydrated milk powder.

The lipid phase may comprise one or more additional ingredients dispersed therein. They may include, for instance, whey proteins and/or soy milk proteins, flavouring agents (such as vanilla or vanillin), and possibly some additional sweetener.

Emulsifier

The emulsion comprises from 0.5 to 5 wt %, preferably 0.5 to 3%, more preferably 0.5 to 1% of an emulsifier, based on the weight of the emulsion. Suitable emulsifiers emulsion can be polyglycerol polyricinoleate (PGPR), lecithin, sugar esters, emulsifying waxes polyglycerol fatty acid esters, polysorbates, monoglycerides, diglycerides and any possible combinations of two or more thereof. Preferably the emulsifier comprises PGPR, more preferably the emulsifier is PGPR.

The emulsion may further comprise additional ingredients such as nuts, nut bits, almonds, almond bits and other types of inclusions, which are preferably crispy and may be flavoured.

Food Product

The invention further relates to a food product comprising the emulsion of the present invention and further food ingredients.

Preferably, the emulsion of the present invention is present as a coating of the food product and/or as a filling in the food product, more preferably, the emulsion is present as a coating of the food product, i.e. preferably the food product comprises the emulsion of the present invention as a coating and/or as a filling, more preferably as a coating.

Coating means a layer encasing the food product, or a layer not fully encasing the food product but present only on part of the food product, such as a layer deposited on top or on one or more surface of the food product. Typically a coating layer has a thickness of from 0.5 mm to 1 cm, more preferably from 1 mm to 5 mm, even more preferably from 1 mm to 3 mm, yet even more preferably from 1 mm to 2 mm, most preferably from 1 mm to 1.5 mm. Any suitable coating method known in the art can be used to obtain a food product coated with the emulsion of the present invention, including enrobing, dipping, spraying, water fall or curtain, showering or bottoming. Advantageously, the emulsion can be first heated before coating is done. Preferably the emulsion is applied as coating at a temperature of from above 8° C., more preferably from 10 to 50° C., even more preferably from 15 to 45° C., more preferably from 20 to 40° C., even more preferably from 25 to 35° C., yet even more preferably from 25 to 30° C.

The emulsion can be a filling in the food product, it is then fully or partially encased by the food product. The filling can be one or more bigger continuous filling or it can be present as a smaller particulate filling dispersed throughout the food product. Any suitable filling method known in the art can be used to obtain a food product comprising the emulsion in the form of a filling. Filling can be done by mixing the emulsion in the form of particles with the rest of the food product; filing can be done by injecting the emulsion into the food product. Advantageously, the emulsion can be first heated before filling is done. Preferably the emulsion is applied as a filling at a temperature of from above 8° C., more preferably from 10 to 50° C., even more preferably from 15 to 45° C., more preferably from 20 to 40° C., even more preferably from 25 to 35° C., yet even more preferably from 25 to 30° C.

The food product preferably has a temperature of 8° C. or lower, more preferably, it has a temperature of from 6 to −40° C., more preferably of 5 to −20° C., even more preferably of 0 to −18° C., yet even more preferably of −4 to −18° C., yet even more preferably of −10° C. to −18° C. and most preferably of −10 to −15° C. Thus preferably the food product is a frozen food product, i.e. has a temperature of 0° C. or below.

The food product can be an ice cream product, a convenience product, a bakery product and the like.

The ice cream product can be an ice cream comprising the emulsion as particulate filling, such as a stracciatella type ice cream for example, it can be ice cream on a stick. Preferably the food product is an ice cream on a stick. Thus preferably, the food product is an ice cream on a stick coated by the emulsion of the present invention.

The convenience product can be a creamy desert, a pudding desert; it preferably comprises the emulsion as a layer on top of it.

The bakery product can be an ice cream biscuit or horn. Preferably the ice cream horn comprises the emulsion as a coating on the inside of the horn.

Process

The invention further relates to a process to produce an emulsion of an aqueous phase in a lipid phase, comprising the steps of:
 a. Providing a lipid phase and an aqueous phase, and
 b. Emulsifying the aqueous phase with part of the lipid phase to obtain a pre-emulsion of the aqueous phase in said part of the lipid phase, and
 c. Optionally cooling the pre-emulsion obtained in step b, and
 d. Adding part of the lipid phase, preferably the remaining part of the lipid phase, under medium to low shear characterized in that the part of the lipid phase in step d. comprises non-fatty cocoa solids and/or non-fatty milk solids.

Thus in the process of the present invention, the lipid phase of the emulsion is added in at least two steps, preferably in two steps. Step d. is done by mixing under medium to low shear and preferably step b. is done by mixing under medium to high shear. It has been found that this two-step addition of the lipid phase under said shear rates, has the advantage of producing an emulsion that is more stable, i.e. has over time less water migration outside the emulsion, and an emulsion that is snappier, harder, in particular under cold to freezing temperatures, compared to an emulsion produced according to a process where the lipid phase is added in one step of the process, or compared to an emulsion where the lipid phase would be added in two steps but not at the shear rates according to the process of the present invention. Further, in the process of the present invention, non-fatty cocoa solids and/or non-fatty milk solids are added in the part of the lipid phase of step d. Preferably non-fatty cocoa solids of the emulsion are substantially only added in the part of the lipid phase of step d.

Step a. comprises providing an aqueous phase, a lipid phase and an emulsifier as defined above. As the lipid phase is added in at least two steps, preferably two steps, the lipid phase may be made up by two lipid phases as defined above.

Step b. comprises emulsifying the aqueous phase with part of the lipid phase to obtain a pre-emulsion of the aqueous phase in said part of the lipid phase. The emulsifier is used for that purpose. It is also possible to use part of the emulsifier in step b. and part of it in step d. of the process. Preferably the lipid phase added in step b. amounts to 20 to 85 wt %, more preferably 30 to 80 wt %, more preferably 40 to 75 wt %, even more preferably 50 to 70 wt %, yet even more preferably from 55 to 65 wt % based on the weight of the total lipid phase provided in step a. of the process.

Preferably the aqueous phase and the lipid phase are emulsified at a temperature of from 40 to 65° C., more preferably from 45 to 60° C., even more preferably from 50 to 60° C. More preferably the aqueous phase and the lipid phase are first brought to a certain temperature before emulsification at above mentioned temperatures. The aqueous phase is preferably brought to a temperature of from 40 to 70° C., more preferably 45 to 65° C., even more preferably from 50 to 60° C. before emulsification. The lipid phase is preferably brought to a temperature of from 40 to 65° C., more preferably from 45 to 60° C., even more preferably from 50 to 60° C. Emulsification of step b. is done until a homogenous pre-emulsion is obtained, in particular until the aqueous phase is dispersed as droplets throughout the lipid phase, preferably said droplets have a particle size as described above. Preferably the emulsification time is from 1 to 60 minutes, more preferably from 5 to 50 minutes, even more preferably from 10 to 40 minutes, yet even more preferably from 15 to 35 minutes, yet even more preferably from 20 to 30 minutes.

Emulsification of step b. is preferably done by mixing under medium to high shear, more preferably high shear. Medium shear means a shear of 5000 rpm. High shear means a shear of above 5000 rpm, preferably of 6000 rpm of higher, more preferably of 7000 rpm or higher, even more preferably of 10000 rpm and higher, yet even more preferably from 10000 rpm to 20000 rpm. Thus step b. is preferably done at a shear of from 5000 rpm to 20000 rpm, more preferably from 7000 rpm to 15000 rpm, even more preferably from 10000 rpm to 15000 rpm.

Emulsification of step b. can be done in any suitable equipment able to provide high shear as mentioned above and preferably able to keep the temperature of the phases relatively constant during emulsification. The aqueous phase and the lipid phase may be added together into the equipment before emulsification starts; alternatively, one of them can be added progressively to the other phase into the equipment, or alternatively both phases can be added progressively into the equipment. The emulsifier may be added simultaneously, or added to one or both phase during step a. for example, or during step b.

Step c. is an optional cooling step, the pre-emulsion may be cooled until it reaches a temperature of from 15 to 35° C., preferably from 20 to 32° C., more preferably from 25 to 31° C. Cooling can be done with any suitable method known by the skilled person.

In step d. of the process, part of the lipid phase, preferably the remaining part of the lipid phase is added under medium to low shear to the pre-emulsion formed previous to step d. Step d. can be done by mixing with any suitable type of equipment providing the required medium to low shear. Medium shear means a shear of 5000 rpm. Low shear means a shear below 5000 rpm. Thus preferably step d. is done at a shear of 1000 rpm to 5000 rpm, preferably of 2000 rpm to 5000 rpm, more preferably of 3000 rpm to 4000 rpm. The lipid phase is defined as above. The lipid phase added in step d. comprises non-fatty cocoa solids and/or non-fatty milk solids. Preferably enough lipid phase is added such as to have all the non-fatty cocoa solids and/or non-fatty milk solids substantially coated by lipid, thus forming a homogeneous mixture. Non-fatty cocoa solids may be provided in the form of full fat cocoa powder, comprising around 12-24 wt % of cocoa butter, defatted cocoa powder, comprising from 10-12 wt % of cocoa butter and/or low fat cocoa powder, comprising around 1 wt % cocoa butter. Also non-fatty cocoa solids may be provided in the form of cocoa liquor. Cocoa liquor is obtained from processing of cocoa beans and comprises around 54 wt % of cocoa butter and around 46 wt % of cocoa particles. Cocoa powder is produced from cocoa liquor by removing part of the fat. Non-fatty milk solids can be provided in the form of full fat, defatted or low fat milk powder.

As mentioned above, this two steps emulsification process is advantageous to produce an emulsion with desirable characteristics in terms of stability, snapping, hardness, in particular under cold to freezing temperatures, and in terms of reduced brittleness, reduced elasticity.

Preferably further, the process comprises step e. of storing the emulsion at a temperature of 8° C. or lower, preferably of 6° C. to −40° C., more preferably of 5° C. to −20° C., even more preferably of 0° C. to −18° C., yet even more preferably of −4° C. to −18° C., yet even more preferably of −10° C. to −18° C. and most preferably of −10 C to −15° C. This further allows keeping the emulsion stable over time, i.e. water migration out of the emulsion is substantially avoided. In the process of the present invention, thus preferably none of the components of the process to produce the emulsion is a chocolate. By chocolate is meant traditional chocolate product, produced with refining, conching and tempering steps.

The present invention further relates to an emulsion obtained by the process of the present invention. As explained above, an emulsion produced according to the process of the present invention has increased stability, increased snapping, hardness, in particular under cold to freezing temperatures, reduced brittleness, reduced elasticity compared to an emulsion produced by a standard process, e.g. where all ingredients, in particular the lipid phase, are added in one step of the process.

Hardness Measurement Method 1

TA.XT Plus texture analyser is used with 4 mm stainless steel probe with flat bottom (SMS/P4) with a 30 kg load cell.

The test mode is set on compression mode, the test speed is set at 0.5 mm/sec and the distance of penetration is set at 10 mm.

20 g of sample is poured in a cup with diameter 6 cm. The cup is put in the freezer at −18° C. overnight. The cup is taken out of the freeze and measured within 5 minutes. Hardness is expressed in gram.

The invention will be illustrated in the following examples.

EXAMPLES

Example 1: Emulsion Process

The equipment used for emulsification is Esco-Labor, type EL-3 PM. The operating temperature of the water bath and screen of the Esco-Labor is put at 50° C. The list of ingredients used can be found in table 1 below.

The cocoa butter '1' and the emulsifier are heated until 40° C., blended in the Esco-Labor with the scraper of the Esco-Labor set at 80 RPM, to form a lipid phase.

In a recipient, the water is heated up to 60° C. and the sugar is added and dissolved to form the aqueous phase.

The aqueous phase is added to the above lipid phase (addition time 1 minute) in the Esco-Labor and blended under high shear, at 10000 RPM during 1 minute; simultaneously the scraper is applied for 1 minute at 80 RPM.

Mixing under high shear is continued during 30 seconds then shear is progressively reduced until low shear of 3000 RPM is reached.

The cocoa liquor is added and mixed for 1 minute at 3000 RPM, simultaneously; the scraper is applied for 1 minute at 80 rpm.

The emulsion is recovered and stored at different temperatures, 4° C., −12° C., −18° C. and −25° C.

TABLE 1

| Ingredients | |
| --- | --- |
| Ingredient | % |
| Cocoa liquor (Cargill, 54 wt % cocoa butter, 46 wt % cocoa powder) | 18 |
| Cocoa butter '1' (Cargill) | 21 |
| Crystalline table sugar | 40 |
| Water | 20 |
| PGPR | 1 |

Hardness is measured (triple measurement) for samples stored at different temperatures. Method 1 is used to measured hardness, except the samples are measured at storage temperature. The average hardness is given below:

| Storage temperature | Hardness (g) measured at storage temperature |
| --- | --- |
| 4° C. | 1250 |
| −18° C. | 1400 |
| −25° C. | 1700 |

Example 2: Comparative Example, Lipid Phase Added in One Step

The ingredients and amounts are the same as in example 1, table 1. The operating temperature of the water bath and screen of the Esco-Labor is put at 50° C.

The cocoa butter '1', cocoa liquor and emulsifier are heated until 40° C., blended in the Esco-Labor with the scraper of the Esco-Labor set at 80 RPM, to form the lipid phase.

In a recipient, the water is heated up to 60° C. and the sugar is added and dissolved to form the aqueous phase.

The aqueous phase is added (1 minute addition time) to the lipid phase in the Esco-Labor and blended under high shear, at 10000 RPM during 1 minute; simultaneously the scraper is applied for 1 minute at 80 RPM.

The emulsion is recovered and stored at a temperature of −18° C. Hardness is measured (triple measurement). The average hardness is 112 g.

What is claimed is:

1. A process to produce an emulsion of an aqueous phase in a lipid phase, comprising the steps of:
   a. Providing a lipid phase and an aqueous phase, and
   b. Emulsifying the aqueous phase with part of the lipid phase to obtain a pre-emulsion of the aqueous phase in said part of the lipid phase, and
   c. Optionally cooling the pre-emulsion obtained in step b, and
   d. Adding part of the lipid phase under medium to low shear, characterized in that the part of the lipid phase in step d. comprises non-fatty cocoa solids and/or non-fatty milk solids.

2. The process of claim 1, characterized in that the lipid phase of step b. and/or
   d. comprises cocoa butter and/or cocoa butter alternatives.

3. The process of claim 1, characterized in that the lipid phase of step d. comprises cocoa liquor.

4. The process of claim 1 wherein the emulsification of step b. is done by mixing under medium to high shear.

5. The process of claim 4, wherein the medium to high shear of step b. is from 5000 rpm to 20000 rpm and the medium to low shear of step d. is from 1000 rpm to 5000 rpm.

6. The process of claim 1 wherein the aqueous phase comprises a sweetener.

7. The process of claim 1 wherein the emulsion comprises 10 to 70 wt % of aqueous phase, based on the total weight of the emulsion and 35 to 90 wt % of lipid phase, based on the total weight of the emulsion.

8. The process of claim 1 wherein the emulsifying in step (b) is at a temperature of from 40 to 65° C.

9. The process of claim 1 further comprising a step (e) wherein step (e) comprises storing the emulsion at a temperature of 8° C. or lower.

10. The process of claim 1 wherein a food product comprises the emulsion.

11. The process of claim 10 wherein the food product comprises further food ingredients.

12. The process of claim 10 further comprising coating the food product with the emulsion.

13. The process of claim 10 further comprising filling the food product with the emulsion.

14. A process to produce a water-in-oil emulsion of an aqueous phase in a lipid phase, comprising the steps of:
   i. providing (a) a first lipid phase comprising an emulsifier; and (b) an aqueous phase,
   ii. combining and emulsifying the aqueous phase with the first lipid phase to obtain a pre-emulsion of the aqueous phase in said lipid phase,
   iii. optionally cooling the pre-emulsion obtained in step ii, and
   iv. adding a second lipid phase comprising non-fatty cocoa solids and/or milk solids to the pre-emulsion to produce the water-in-oil emulsion.

15. The process of claim 14 wherein the aqueous phase comprises a sweetener.

16. The process of claim 15 wherein the aqueous phase comprises from 5 to 60 wt. % of the sweetener based on the total weight of the emulsion.

17. The process of claim 15 wherein the water-in-oil emulsion comprises from 10 to 70 wt. % of the aqueous phase, 5 to 60% of the sweetener, at least 95% of which is in the aqueous phase, and from 35 to 90 wt. % of the lipid phase, each based on the total weight of the emulsion.

18. The process of claim 14 wherein all the non-fatty cocoa solids and/or non-fatty milk solids are substantially coated by lipid in the lipid phase.

* * * * *